C. ELLIS.
PROCESS AND APPARATUS FOR TREATING COMPOSITE EDIBLE OILS, &c.
APPLICATION FILED JULY 12, 1913.
1,095,144. Patented Apr. 28, 1914.
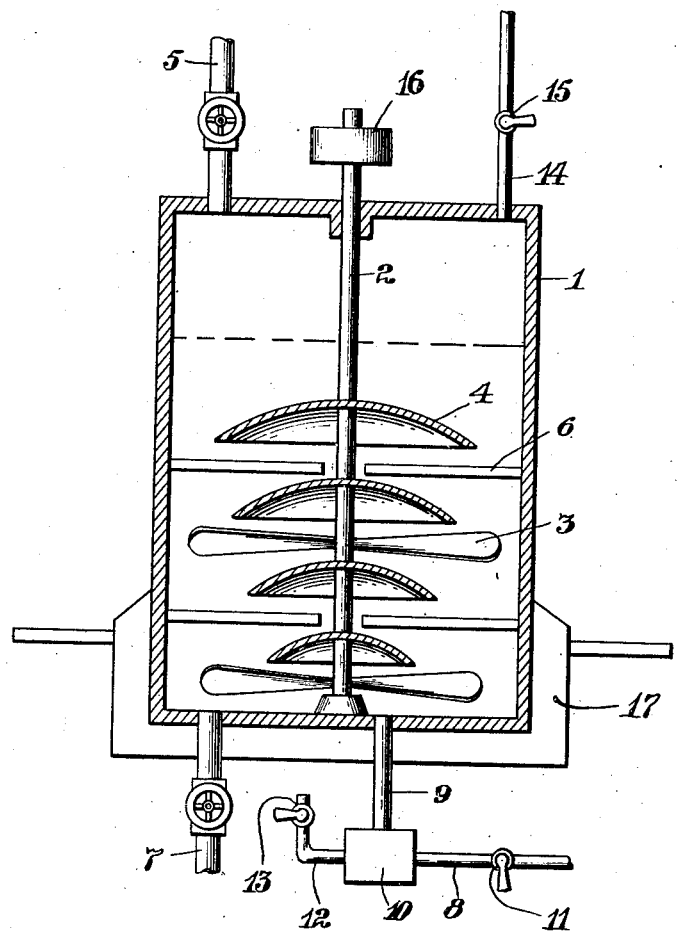

UNITED STATES PATENT OFFICE.

CARLETON ELLIS, OF MONTCLAIR, NEW JERSEY.

PROCESS AND APPARATUS FOR TREATING COMPOSITE EDIBLE OILS, &c.

1,095,144. Specification of Letters Patent. Patented Apr. 28, 1914.

Application filed July 12, 1913. Serial No. 778,731.

*To all whom it may concern:*

Be it known that I, CARLETON ELLIS, a citizen of the United States, and a resident of Montclair, in the county of Essex and State of New Jersey, have invented certain new and useful Improvements in Processes and Apparatus for Treating Composite Edible Oils, &c., of which the following is a specification.

This invention relates to the process of hydrogenation of unsaturated fats, more particularly composite fatty material intended for edible purposes and to apparatus for carrying out such process and is further concerned with the hydrogenation of such material by the aid of nickel carbonyl as a potentially available catalytic body.

The treatment of composite oils such as corn or soya bean and cotton seed oil mixtures, fish or whale oil and olein, likewise the various esters of oleic acid and other oils or oil mixtures having unsaturated components of varying iodine number is difficult to carry out selectively so as to yield a well hydrogenated product free from a tendency of some at least of its components to quickly becoming rancid on exposure to air.

By the present invention control over the several stages of hydrogenation may be nicely secured and sweet smelling edible products obtained by hydrogenation without necessarily resorting to subsequent steam treatment to effect deodorization. This application is a divisional continuation in part of my co-pending applications Serial Nos. 692,903, filed April 24, 1912 and 688,814 filed April 5, 1912, particularly as regards the employment of nickel carbonyl under suitable thermal conditions as hereinafter referred to and as regards the exposure of a moving body of oil, in the presence of a catalyzer to a bubbling current of hydrogen, as disclosed in my application Serial No. 692,903.

The accompanying diagrammatic drawing illustratively shows apparatus suitable for carrying out the present invention. The drawing depicts in vertical section a treating receptacle having a stirring device and means for the introduction of the reacting materials.

In the drawing 1 is a closed receptacle and mixing chamber, having the propeller 2, blades as indicated by 3, being suitable for the purpose. The receptacle is provided with heating means, a jacket 17 into which steam or other heating agent may be introduced being shown.

5 is a valved inlet pipe for admitting the oily body, with or without catalyzer, to the receptacle.

6 designates one of several baffles or screens set intermediate the paths of travel of the several propeller blades.

7 is a valved outlet pipe for the withdrawal of the treated oil or fat. The pipe 9 serves for the admission of hydrogen gas or any other suitable gas containing hydrogen or similar reducing element. The shaft 2 preferably carries the bells 4 which serve to intercept some of the gas in its upward flow through the oil and permits of greater contacting surface. These bells may, however, be omitted and the gas may be allowed to travel upwardly subject to such deviations as may result from the movement of the oil by the propeller blades 3 which movement is substantially transverse to the general upward trend of the gas. The baffles or screens 6 may likewise be omitted if desired. The pipes 8 and 12 serve for mixing hydrogen and nickel carbonyl when the latter is used as a source of catalytic material, mixing taking place in the chamber 10 which may be dispensed with when the catalyzer is not introduced in this manner.

14 is an exit pipe for the hydrogen or other gaseous material, the rate of flow being governed by the valve 15.

The hydrogen gas may be admitted either intermittently or continuously to the treating receptacle according to the adjustment of the several valves shown herein.

As an illustrative example an oil or oil mixture such as cotton and corn oil in various proportions may be placed in the receptacle and a catalyzer introduced such for example as nickel material in the form of nickel carbonyl, nickel, platinum, palladium and the like, mixed with or coated on, or impregnating coöperative material such as finely divided wood charcoal, or if desired on an inert carrier such as fullers' earth, clay, pumice, infusorial earth, etc. The oil is heated to the desired temperature, say 180°–185° C. for a nickel catalyzer and hydrogen passed through the oil. The propeller blades are put in motion and the oil thus exposed to hydrogen in the presence of a catalyzer until suitably hardened.

As another illustrative example of the process of the present invention, one may place in the receptacle a charge of, say, cotton-seed oil and heat to a temperature of about 180° C. A quantity of nickel carbonyl, equivalent to about 1% or so of the weight of the oil is mingled with hydrogen gas and brought into contact with the oil with gentle agitation for a period of an hour or more according to the degree of hydrogenation required.

In accordance with the oil to be treated, the pressure of the hydrogen may vary from below atmospheric up to a pressure of 10-lbs. to 25-lbs. to the square inch, or higher.

My invention is preferably adapted to treat oil mixtures, or oils of a composite nature, especially those intended for edible purposes, but it may also be used to treat oils of a more simple character and other materials.

What I claim is:

1. The process of treating fatty materials, containing unsaturated bodies, which comprises exposing a moving body of the same in liquid condition, and in the presence of a catalyzer, to a bubbling current of hydrogen, the general direction of the movement of the body of the mixture being across the path of travel of the hydrogen current.

2. The process of treating a mixture of edible cotton and corn oils, which comprises exposing a moving body of such mixture, in the presence of a catalyzer, to a bubbling current of hydrogen, the general direction of movement of such mixture being substantially transverse to the general direction of movement of said hydrogen current.

3. The process of treating a mixture of edible fatty oils, and the like, which comprises exposing a moving body of such mixture, in the presence of a catalyzer, to a bubbling ascending current of hydrogen, the general direction of movement of such mixture being at an angle to the general direction of movement of such hydrogen current.

4. The process of treating a mixture of edible fatty oils and the like, which comprises exposing a moving body of such mixture, in the presence of a catalyzer, to a bubbling ascending current of hydrogen, the mixture being caused to circulate in a generally uniform plane, at an angle to the general direction of movement of the hydrogen current, during such treatment.

5. The process of treating a mixture of edible fatty oils and the like, which comprises exposing a moving body of such mixture, in the presence of a catalyzer and in a heated condition, to a bubbling ascending current of hydrogen, the general direction of movement of such mixture being across the path of travel of the ascending hydrogen current.

6. The process of treating a mixture of fatty oils and the like, which comprises exposing a moving body of the same, in the presence of a catalyzer and in a heated condition, to an ascending bubbling current of a hydrogen containing gas, the general direction of movement of the mixture being across the path of travel of the hydrogen and impeding the upward flow of the hydrogen containing gas while in contact with the mixture.

7. The process of treating fatty oil and the like, which comprises exposing a moving body of said oil with nickel carbonyl and at a temperature sufficient to decompose said carbonyl, to a current of a hydrogen containing gas, the general direction of movement of such oil being across the path of travel of the current of hydrogen containing gas.

8. The process of treating fatty oil and the like, which comprises exposing the same in the presence of a finely divided catalyzer and in a heated condition, to a bubbling current containing hydrogen, the general direction of movement of said oil being substantially transverse to the general direction of movement of said current.

9. An apparatus for treating oils, comprising a closed treating receptacle adapted to contain a body of oil and a catalyzer, means for passing a current of hydrogen containing gas through the oil and means for maintaining the body of oil in motion in a generally uniform direction and across the path of travel of the said current.

10. An apparatus adapted for treating composite oils, comprising a closed treating receptacle adapted to contain a body of oil and a catalyzer, means for passing a current of hydrogen containing gas through the body of oil and means for maintaining said body of oil in motion in a general direction transverse to the general direction of movement of the current of hydrogen.

11. An apparatus adapted for treating oils comprising a closed treating receptacle adapted to contain a body of oil and a catalyzer, means for passing a current of hydrogen containing gas through the body of oil, means for impeding the flow of said gas through said oil and means for maintaining said body of oil in motion in a general direction transverse to the general direction of movement of the current of hydrogen containing gas.

Signed at Montclair in the county of Essex and State of New Jersey this 10th day of July A. D. 1913.

CARLETON ELLIS.

Witnesses:
B. M. Ellis,
F. Carbutt.